United States Patent [19]

Harrington

[11] Patent Number: 5,959,683
[45] Date of Patent: Sep. 28, 1999

[54] SYSTEM TO REMOVE ARTIFACTS IN A DIGITAL IMAGE DERIVED FROM A TELEVISION SIGNAL

[75] Inventor: Steven J. Harrington, Webster, N.Y.

[73] Assignee: Xerox Corporation, Stamford, Conn.

[21] Appl. No.: 08/883,415

[22] Filed: Jun. 26, 1997

[51] Int. Cl.$^6$ ..................................................... H04N 5/14
[52] U.S. Cl. ........................... 348/511; 348/739; 348/537
[58] Field of Search ..................................... 382/269, 268, 382/266, 267, 275; 345/136, 137; 348/497, 607, 536–540, 451, 699, 739

[56] References Cited

U.S. PATENT DOCUMENTS

| 4,814,879 | 3/1989 | McNeely | 348/537 |
| 4,943,857 | 7/1990 | Izuno et al. | 348/537 |
| 4,994,900 | 2/1991 | Ebara et al. | 358/31 |
| 5,473,389 | 12/1995 | Eto et al. | 348/669 |
| 5,502,509 | 3/1996 | Kurashita et al. | 348/669 |
| 5,572,246 | 11/1996 | Ellis et al. | 348/2 |
| 5,583,579 | 12/1996 | Shim | 348/668 |

Primary Examiner—David E. Harvey
Attorney, Agent, or Firm—R. Hutter

[57] ABSTRACT

An image data modification technique addresses certain image defects characteristic of still images derived from original video sources, such as television or videotape. A lack of vertical alignment of pixels in a single frame, causing a "wobble" or "jitter" artifact in the image, is detected and corrected by a series of algorithms.

12 Claims, 2 Drawing Sheets

SYSTEM TO REMOVE ARTIFACTS IN A DIGITAL IMAGE DERIVED FROM A TELEVISION SIGNAL

FIELD OF THE INVENTION

The present invention relates to a method for improving an image derived from a television or video tape signal source so that the image can be favorably printed, for example, with a color digital printer.

BACKGROUND OF THE INVENTION

In the digital printing of color images, image-based digital data causes placement of different colorants at specific locations on a print sheet. These colorants, such as toner or liquid ink, typically relate to primary colors which are blended together on the print sheet to yield a realistic image. Because a typical set of colorants would be cyan, magenta, and yellow (CMY), it follows that the image data, on a pixel-by-pixel basis, would be in a CMY color space.

Signals for television or video tape transmission, however, generally do not operate in a CMY or similar color space. Rather, there are provided separate luminance and chrominance signals. The luminance signal controls the overall brightness of a particular portion of an image being rendered, and one or more chrominance signals are used to indicate coloration of a particular area of the image. In the color signal specified by the National Television System Committee (NTSC), the chrominance signal is superimposed on a high-frequency region of the luminance signal; in general the purpose of this arrangement is to allow color original signals to be received on a black-and-white receiver.

When deriving still images from an original video source, such as for digital printing, another common image defect is a lack of alignment among pixels in the horizontal columns of the image. FIG. 1 illustrates this type of image defect in the case of a test image of a letter R which is disposed near an edge E of a sample image. It will be noticed that the first pixel of each successive horizontal line at edge E is not vertically aligned with its neighbors. Within the context of video images, this lack of alignment will cause a general "wobble" or "jitter" artifact in the image. This lack of vertical alignment is particularly noticeable with the use of consumer video cassette recorders. The lack of vertical alignment may not be objectionable in a moving image, but can be readily apparent when a single frame of the video image is sampled for printing. It is thus an object of another aspect of the present invention to provide a system whereby the print defect of lack of vertical alignment can be detected and then corrected.

DESCRIPTION OF THE PRIOR ART

U.S. Pat. No. 4,994,900 discloses a circuit for separating luminance and chrominance signals from a video signal. The circuit samples a set of frames from the video image and then circulates a composite video signal within the circuit, so as to detect motion within the sampled frames. This technique aides in accurate separation of luminance and chrominance signals.

U.S. Pat. No. 5,473,389 discloses another filter for separating luminance and chrominance signals, which comprises three-dimensional filters for subtracting the color video signal and signals of frame-advanced or delayed signals. In brief, the reference relies on detecting inter-frame motion of the image to enhance the filtering.

U.S. Pat. No. 5,502,509 discloses a method for separating luminance and chrominance filters, which relies on detecting a quantity of motion in the video signal.

U.S. Pat. No. 5,572,246 discloses a system for recognizing whether a short quantity of moving video data, such as a television commercial has been broadcast. The system examines the pattern of average luminance values at a few specified points in a video image. The overall system is concerned with overall shifts to the right or left of the entire picture, by comparing pixels at the left boundary of the picture to a predetermined reference signal.

In Kokaram et. al., "Line Registration of Jittered Video," 1997 International Conference on Acoustics, Speech and Image Processing (volume 4, page 2553), a two-dimensional autoregressive model is used to predict horizontal scan displacements. The method does not focus on the behavior of edges where jitter is most visible, and must be repeatedly carried out on blocks of pixels since it is computationally intractable to estimate the displacements of all lines in the image at once.

SUMMARY OF THE INVENTION

According to one aspect of the present invention, there is provided a method of modifying image data, the image data comprising luminance signals each associated with the pixel. The pixels correspond to a series of horizontal lines. The horizontal lines are organizable to form a two-dimensional array of pixels forming an image. A lack of alignment of a first scan line relative to a second scan line in the two-dimensional array of pixels is detected in the image data. A location of the first horizontal line is shifted relative to the second horizontal line in the two-dimensional array.

DETAILED DESCRIPTION OF THE INVENTION

Figure 1:
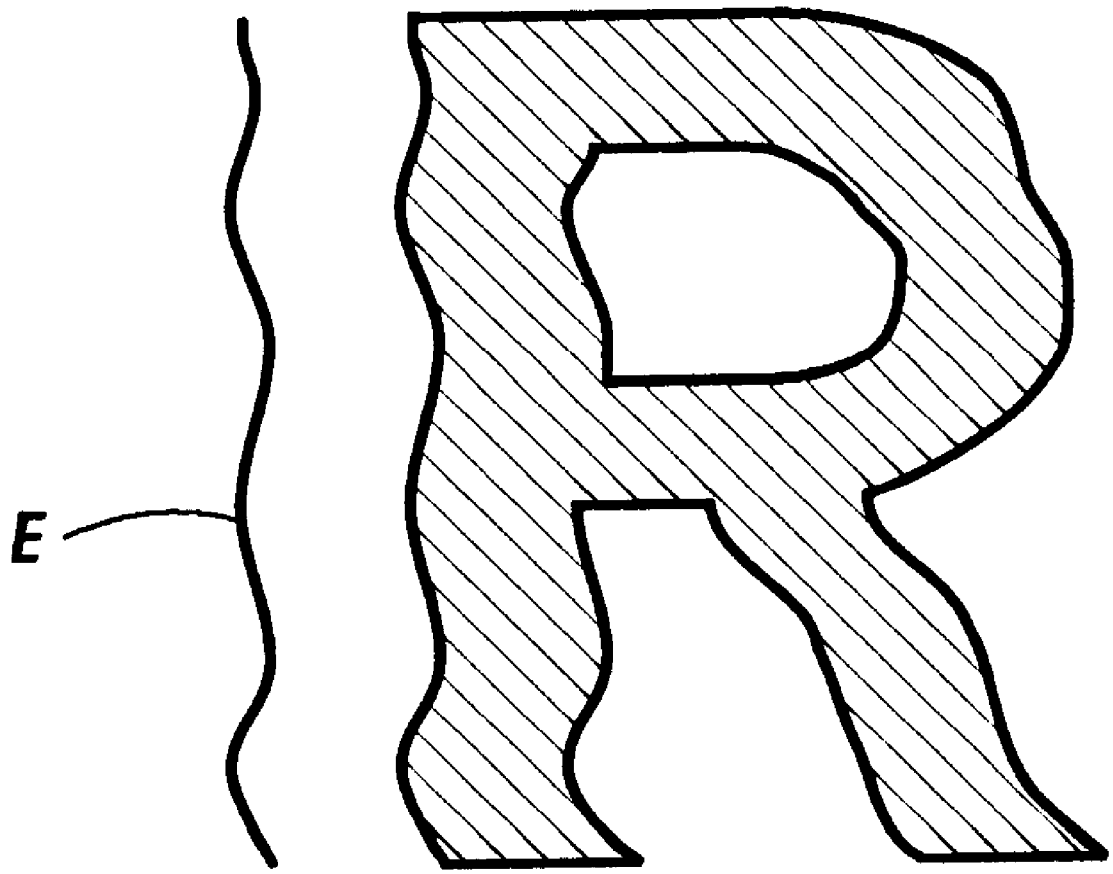
FIG. 1 is an illustration of a portion of a sample image illustrating the "image wobble" phenomenon.
Figure 2:
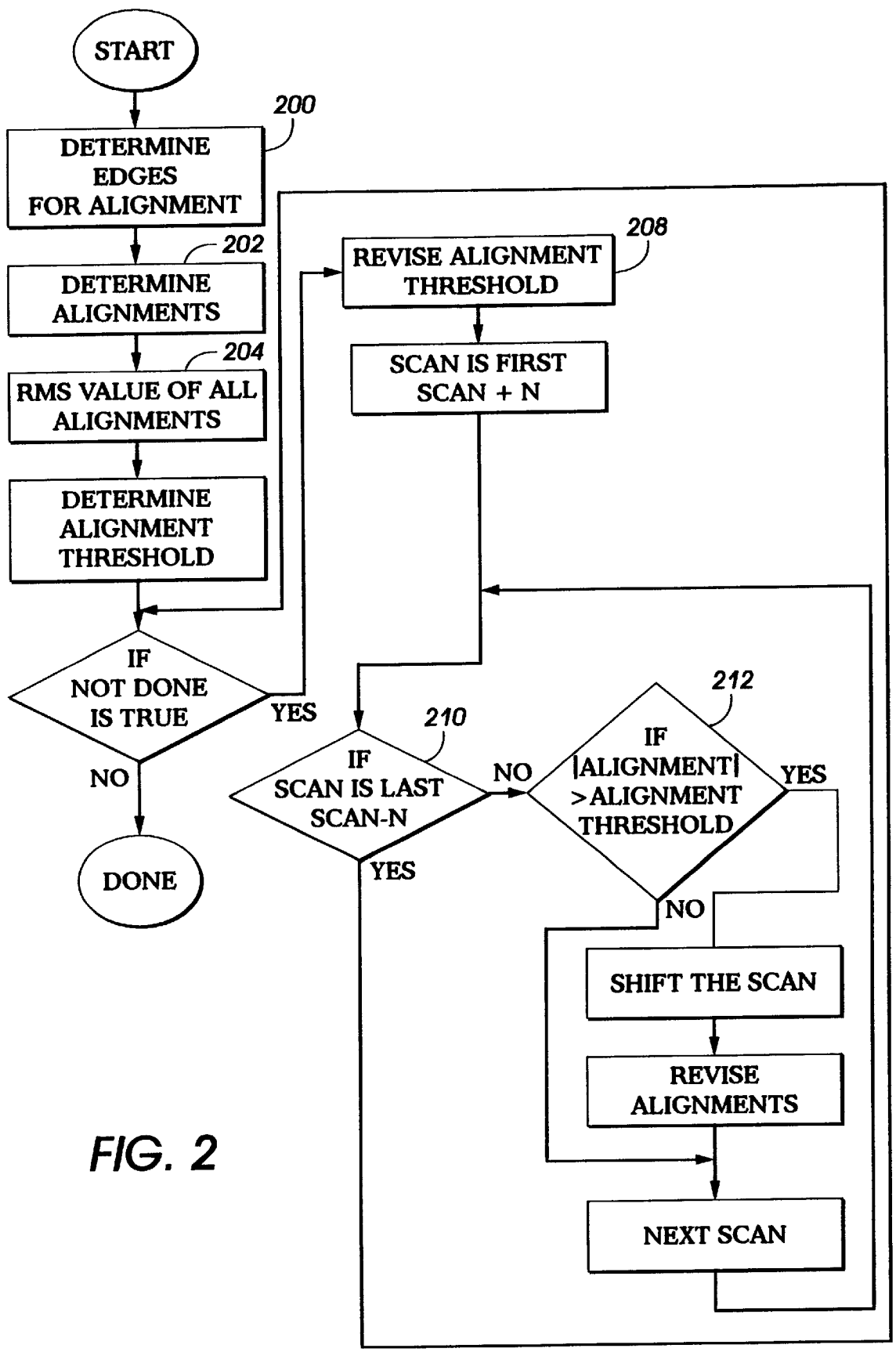
FIG. 2 is a flowchart of a process according to the present invention for addressing the problem of image wobble.

An overview of the image-correcting process of the present invention is shown in the flowchart of FIG. 2. The overall image-correcting process can be carried out on digital image data which has been converted from the analog television signal or other video source.

The first step in the process is to identify the vertical edges in the sample image; these vertical edges are most likely to show the "wobble" or "jitter" which is desired to be removed. A horizontal gradient is identified in a train of luminance signals, smoothed in the horizontal direction and then peaks detected, as shown at block 200. This can be done by sampling a moving average of the luminance component of the pixel values; local peaks in this moving average indicate abrupt changes in luminance which are likely to be consistent with image edges. If the luminance of the $p^{th}$ pixel on the scan line s is y(p, s) then the absolute horizontal gradient g(p, s) can be estimated as $$g(p, s) = |y(p+1, s) - y(p-1, s)|$$

A smoothed gradient h(p,s) can be calculated by summing the values of a neighborhood:

$$h(p, s) = g(p+l, s) + g(p, s) + g(p-1, s)$$

A pixel can be considered to be an edge pixel if its smoothed gradient is larger than its neighbor's values (i.e., the moving average is a local maximum) and also larger than some threshold to distinguish edges from noise:

$$h(p, s)>h(p-1, s) \text{ and } h(p, s)>h(p+1, s) \text{ and } h(p, s)>\text{Noise Threshold}$$

According to a preferred embodiment of the invention, a suitable value for a "Noise Threshold" is about 4 on a scale where smoothed-gradient values vary between 0 and 255. If the smoothed gradient of a pixel meets the criteria for being an edge pixel, the scanline to which the pixel belongs is deemed to be out of alignment with its neighbors. If such a scan line is found, as will be shown below, it is shifted a pixel left or right to bring it into closer alignment.

Each scan line is tested and an alignment measure for the scanline is computed in block 202. The measure is determined as follows: for each edge pixel within the scan line (p, s) adjacent pixels in N scan lines above and N scan lines below the current scan line are examined. N is a small value such as 6 that limits the neighborhood. Beginning at i equal to 1, for values of i less than N, pixels at (p−1, s+i) and at (p−1, s−i) (that is, pixels one position to the left for i scan lines above and below the edge pixel of interest) are checked for the presence of other edge pixels; edge pixels in the neighborhood of a particular pixel are likely to form part of an edge in the image which could exhibit wobble. Each scan begins with the alignment measures set to zero. For each edge pixel found at these neighboring locations the alignment measure for the current scan is decremented. Pixels at (p+1, s+i) and at (p+1, s−i) (i.e., to the right and above and below the edge pixel of interest) are also checked, and for each edge pixel found here the alignment measure is incremented. This process is carried out for every edge pixel of the current scan line and the result is the alignment measure for the scan line.

Next, the RMS value (A) for the alignment measures of a set of scan lines is calculated, as shown at block 204. For a series of scan lines toward the middle of a frame, the alignment value of the scan line (which is the net value computed from all edges found within the scan) is squared and the squared values summed for an entire frame. The RMS value A is calculated as the root mean square of the alignment values over all the scan lines being considered. The middle scan lines are used because the above-described step of determining the alignment measure for a scan line requires considering values of N scan lines above and N scan lines below the current scan line, and so using the top or bottom N scan lines in a frame would skew the results.

As shown at block 206, an alignment threshold is then determined, based on the RMS value A described above. This alignment threshold is calculated as fA+c, where f is a threshold factor of about 1.5 and c is a value which is initially zero, but is increased on each cycle through the scan lines, for reasons which will be described below. This revision of the alignment threshold is shown at block 208.

The scan lines are stepped through one at a time, as shown by decision block 210, and those which satisfy the alignment criteria are shifted, as shown by decision block 212 and its following steps. Any scan line with an alignment measure greater than fA+c is shifted one pixel to the right. Any scan line with an alignment measure less than —fA—c is shifted one pixel to the left.

When a scan line is shifted, its alignment measure and that of the N scan lines above and below it are recalculated. Once all scans have been checked, if any were shifted, then the scans are checked again for additional shifting. This can occur because of the updating of the alignment measures with the original shifting. The increase of the value c which each cycle through the scan lines ensures that the shifting will eventually cease.

While the invention has been described with reference to the structure disclosed, it is not confined to the details set forth, but is intended to cover such modifications or changes as may come within the scope of the following claims.

I claim:

1. A method of modifying image data, the image data corresponding to a plurality of luminance signals, each luminance signal associated with a pixel, the pixels corresponding to a series of scan lines, the scan lines being organizable to form a two-dimensional array of pixels forming an image, comprising the steps of:

detecting in the digital data a lack of alignment of a first scan line relative to a second scan line in the two-dimensional array of pixels, said detecting step including identifying an edge pixel in a scan line, the identifying step including the steps of sampling a moving average of luminance changes for a series of pixels in the scan line; and identifying a pixel corresponding to a local maximum in the moving average as an edge pixel, and shifting a location of the first horizontal line relative to the second horizontal line in the two-dimensional array.

2. A method of modifying image data, the image data corresponding to a plurality of luminance signals, each luminance signal associated with a pixel, the pixels corresponding to a series of scan lines, the scan lines being organizable to form a two-dimensional array of pixels forming an image, comprising the steps of:

detecting in the digital data a lack of alignment of a first scan line relative to a second scan line in the two-dimensional array of pixels, said detecting step including identifying an edge pixel in a scan line, and for an identified edge pixel in a given scan line, identifying edge pixels near the identified edge pixel in a neighborhood of scan lines around the given scan line; and shifting a location of the first horizontal line relative to the second horizontal line in the two-dimensional array.

3. The method of claim 1, the detecting step further including the steps of for an identified edge pixel in a given scan line, identifying edge pixels near the identified edge pixel in a neighborhood of scan lines around the given scan line; and incrementing an alignment measure if there is identified an edge pixel in a first area near the identified edge pixel, and decrementing the alignment measure if there is identified an edge pixel in a second area near the identified edge pixel.

4. The method of claim 3, the detecting step further including the step of associating each scan line with an alignment measure for an edge pixel in said scan line; and for a set of scan lines, comparing the alignment measure associated therewith to an alignment threshold.

5. The method of claim 4, the alignment threshold being calculated based at least partially on a root mean square of a set of alignment measures derived from the image data.

6. The method of claim 4, the shifting step including the step of shifting a scan line if the alignment measure of the scan line is of a predetermined relationship with the alignment threshold.

7. The method of claim 4, further comprising the steps of
changing the alignment threshold;
after said shifting step, for a set of scan lines, comparing the alignment measure associated therewith to the changed alignment threshold; and
shifting a scan line if the alignment measure of the scan line is of a predetermined relationship with the changed alignment threshold.

8. The method of claim 2, the detecting step further including the step of incrementing an alignment measure if there is identified an edge pixel in a first area near the identified edge pixel, and decrementing the alignment measure if there is identified an edge pixel in a second area near the identified edge pixel.

9. The method of claim 8, the detecting step further including the step of
associating each scan line with an alignment measure for an edge pixel in said scan line; and
for a set of scan lines, comparing the alignment measure associated therewith to an alignment threshold.

10. The method of claim 9, the alignment threshold being calculated based at least partially on a root mean square of a set of alignment measures derived from the image data.

11. The method of claim 9, the shifting step including the step of
shifting a scan line if the alignment measure of the scan line is of a predetermined relationship with the alignment threshold.

12. The method of claim 9, further comprising the steps of
changing the alignment threshold;
after said shifting step, for a set of scan lines, comparing the alignment measure associated therewith to the changed alignment threshold; and
shifting a scan line if the alignment measure of the scan line is of a predetermined relationship with the changed alignment threshold.

\* \* \* \* \*